(12) United States Patent
Gao et al.

(10) Patent No.: US 11,779,958 B2
(45) Date of Patent: Oct. 10, 2023

(54) ULTRASONIC STEPPING MOTOR DEVICE FOR GENERATING ULTRA-FINE SINGLE DROPLET

(71) Applicant: JIANGSU UNIVERSITY, Zhenjiang (CN)

(72) Inventors: Jianmin Gao, Zhenjiang (CN); Ke Xu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 120 days.

(21) Appl. No.: 17/638,227

(22) PCT Filed: Nov. 29, 2021

(86) PCT No.: PCT/CN2021/133969
§ 371 (c)(1),
(2) Date: Feb. 25, 2022

(87) PCT Pub. No.: WO2022/135069
PCT Pub. Date: Jun. 30, 2022

(65) Prior Publication Data
US 2023/0158544 A1    May 25, 2023

(30) Foreign Application Priority Data
Dec. 24, 2020 (CN) .......................... 202011550157.3

(51) Int. Cl.
*B06B 1/06* (2006.01)
(52) U.S. Cl.
CPC .......... *B06B 1/0611* (2013.01); *B06B 1/0651* (2013.01)

(58) Field of Classification Search
CPC ..... B06B 1/0611; B06B 1/0651; B05B 17/06; B05B 17/0607
See application file for complete search history.

(56) References Cited

U.S. PATENT DOCUMENTS 5,741,554 A * 4/1998 Tisone ................... B05B 7/066
427/424
7,533,830 B1 * 5/2009 Rose .................... H10N 30/505
239/69

(Continued)

FOREIGN PATENT DOCUMENTS

CN 102500502 A 6/2012
CN 104689946 A 6/2015

(Continued)

*Primary Examiner* — J C Jacyna
(74) *Attorney, Agent, or Firm* — Bayramoglu Law Offices LLC

(57) ABSTRACT

An ultrasonic stepping motor device for generating ultra-fine single droplet includes a valve housing, a valve core, and a spring. The valve core and the spring are installed inside the valve housing, and the valve core abuts against a liquid inlet of the valve housing under an elastic force of the spring. The valve housing is connected with a injector through a catheter, and the catheter is driven for linear operation by the inverse piezoelectric effect of piezoelectric ceramics through an ultrasonic linear motor. A right end of the catheter is equipped with a rubber piston, and the rubber piston is arranged in a cavity of the injector and matched with the injector. Since the piezoelectric vibrator driven catheter can produce nano feed length, and the volume of droplets overflowed each time can reach micron level, which can meet the requirements of producing micro droplets.

9 Claims, 6 Drawing Sheets

(56) References Cited

U.S. PATENT DOCUMENTS

Figure 1:
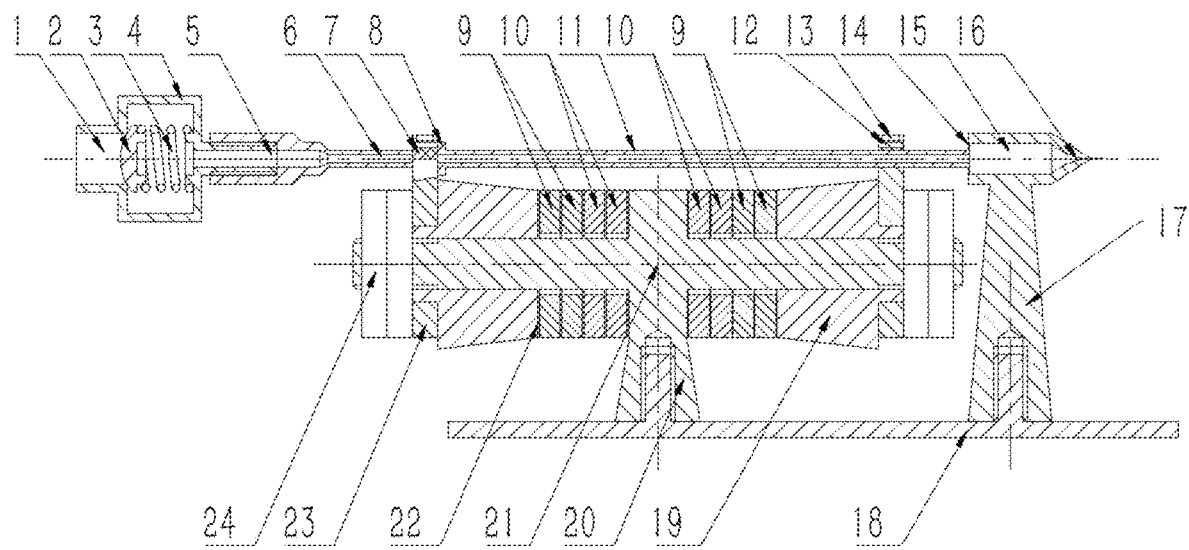
Figure 2:
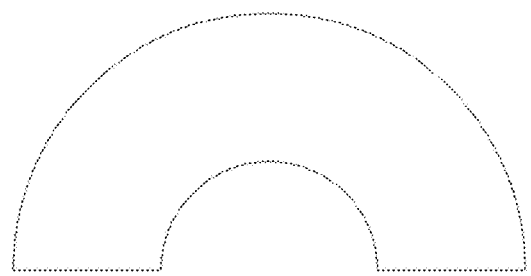

| | | | |
|---|---|---|---|
| 2009/0057438 A1* | 3/2009 | Hofbauer | F02M 51/0603 |
| | | | 239/102.2 |
| 2009/0232681 A1 | 9/2009 | Ham et al. | |
| 2016/0213866 A1* | 7/2016 | Tan | A61M 15/0021 |
| 2019/0054492 A1* | 2/2019 | Gao | B05B 7/12 |

FOREIGN PATENT DOCUMENTS

| | | |
|---|---|---|
| CN | 205146560 U | 4/2016 |
| CN | 112701954 A | 4/2021 |

\* cited by examiner

ULTRASONIC STEPPING MOTOR DEVICE FOR GENERATING ULTRA-FINE SINGLE DROPLET

CROSS REFERENCE TO THE RELATED APPLICATIONS

This application is the national phase entry of International Application No. PCT/CN20211133969, filed on Nov. 29, 2021, which is based upon and claims priority to Chinese Patent Application No. 202011550157.3, filed on Dec. 24, 2020, the entire contents of which are incorporated herein by reference.

TECHNICAL FIELD

The invention relates to an ultrasonic stepping motor device for generating ultra-fine single droplet, belonging to the field of agricultural engineering.

BACKGROUND

In agricultural engineering, micro single droplet is very important for quantitative analysis of crop nutrient uptake. At present, microfluidic chips are mainly used in the field of microfluidics. Most of these chips require high processing precision, and high processing cost, which cannot be mass-produced. Another technique for generating small single droplet is used in inkjet printers, usually using thermal foaming or piezoelectric technology. Most of these schemes are complex and inaccurate, requiring complex control system.

To sum up, the equipment for producing small single droplet generally suffers from low precision, complex structure, and high cost.

SUMMARY

In the view of deficiencies of the prior technology, an ultrasonic stepping motor device for generating ultra-fine single droplet is invented, which utilizes the inverse piezoelectric effect of piezoelectric ceramics to drive the catheter in linear motion. Using the nano-scale feed length of the ultrasonic linear motor, the liquid in the cavity is squeezed out of the injector to obtain low cost, and high precision micro-droplets.

The specific technical scheme adopted in the present invention is as follows:

The ultrasonic stepping motor device for generating ultra-fine single droplet is characterized that it includes a valve core, spring, valve housing, rubber gasket, catheter, rubber piston, injector, injector bracket, floor, motor bracket, shifting teeth and an ultrasonic linear motor.

The valve core and the spring are installed inside the valve housing, and the valve core is presented against the liquid inlet of the valve housing under the elastic force of the spring. The first infusion hole of the valve housing is connected and communicated with the catheter through threads. The right end of the catheter is equipped with a rubber piston, and the rubber piston is arranged in the cavity of the injector and matched with it.

The injector is supported by the injector bracket installed on the floor. The motor bracket is installed on the floor by threaded connection. The ultrasonic linear motor is installed on the motor bracket.

An ultrasonic linear motor comprises a first piezoelectric ceramic, the second piezoelectric ceramic, the shaft sleeve, a double end stud, the partition, and the nut.

The double end stud is fixed on the motor bracket. The first piezoelectric ceramic and the second piezoelectric ceramic are symmetrically installed on the double end stud. However, the second piezoelectric ceramic is located near the center of the double end stud, and the first piezoelectric ceramic is placed outside the second piezoelectric ceramic. The partition is arranged between the first piezoelectric ceramic, the second piezoelectric ceramic and the shaft sleeve. The shaft sleeve is arranged at the both ends of the double end stud and is compressed by the nut.

The shifting teeth is arranged between the shaft sleeve and the nut.

The catheter is installed on the upper end of the shifting teeth.

Further, the first piezoelectric ceramic is a semi-circular ring, with a total of eight pieces. The second piezoelectric ceramic is a circular ring, with a total of four pieces. Every two pieces of the first piezoelectric ceramics are spliced into a ring and installed on the double end stud, and the polarization directions of the upper and lower first piezoelectric ceramics on the same plane are opposite. The driving voltage phase difference is 180 degrees. Further, the upper and lower polarization directions of the second piezoelectric ceramics are the same, and the phase difference of the driving voltage is 180 degrees. The driving voltage phase difference between the first piezoelectric ceramic and the second piezoelectric ceramic is 90 degrees.

Further, the cavity of the injector close to the outlet hole is a herringbone guide hole.

Accordingly, the length of the outlet hole of the injector is 2-4 mm, and the length of the cavity is 8-10 mm.

The cavity diameter is calculated from the diameter of the droplet produced, and the single feed size of the catheter is determined by the following formula:

$$\frac{\pi}{4}d_1^2 x = \frac{\pi}{6}d_2^3$$

Where, x is the feed length of the catheter, $d_1$ is the diameter of the cavity, and $d_2$ is the diameter of the outlet hole of the injector.

The shape of the shaft sleeve is an outward expanding horn shape.

Furthermore, the retaining ring is arranged on the right side of the shifting teeth on the catheter.

Further, the diameter of the retaining ring is 4-5 mm and its width is 1-2 mm.

In addition, the diameter of the liquid inlet is 5-6 min and its length is 6-10 mm, the diameter of the first infusion hole is 3-4 mm and its length is 16-20 mm, and the diameter of the second infusion hole is 1-1.5 mm and its length is 75-85 mm.

Additionally, the catheter is clamped by a rubber gasket and the shifting teeth, an end cap is provided the rubber gasket, and these three sequentially connected from bottom to top by bolts. The beneficial effects of the present invention are as follows:

1. The catheter is driven by a composite mode piezoelectric vibrator that works in longitudinal and bending modes. An AC excitation voltage signal of the same ultrasonic frequency is applied to the first piezoelectric ceramics and the second piezoelectric ceramics.

However, the longitudinal and bending vibration modes of the first piezoelectric ceramics and the second piezoelectric ceramics are excited at the same time. There are two vibration modes of directional and bending, so that the shifting teeth is excited at the resonance frequency, and the surface of the shifting teeth is in contact with the catheter at both ends, and form an elliptical motion and enlarge. When a certain pre-tightening force is applied to the catheter so that the shifting teeth at both ends pressed against the moving body. The catheter is driven to make a linear motion through the friction between the shifting teeth and the catheter.

2. The linear motion of the catheter can generate the feed length, which can overflow the liquid in the cavity, and the single liquid overflow volume can be calculated by measuring the feed length. Since the piezoelectric vibrator driven catheter can produce nano feed length, the volume of droplets overflowed each time can reach micron level, which can meet the requirements of producing small single droplets.

Figure 3:
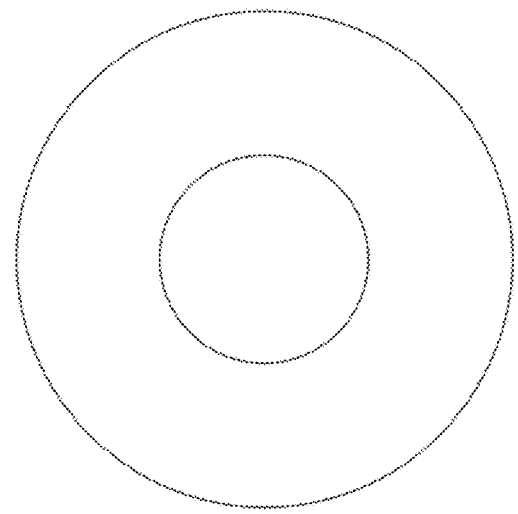

3. The shape of the shaft sleeve adopts an outward expanding horn shape, which can slow down the feeding speed of the catheter each time, so that the liquid can slowly overflow and improve the accuracy.

The voltage signal excited by ultrasonic frequency causes the piezoelectric ceramics to vibrate at the ultrasonic frequency. Through vibration conduction, the overflowing liquid is vibrated, causing the droplets to fall off the injector.

BRIEF DESCRIPTION OF THE DRAWINGS

FIG. 1 is a structural diagram of the ultrasonic stepping motor device for generating ultra-fine single droplet;

FIG. 2 is a schematic diagram of the first piezoelectric ceramic;

FIG. 3 is a schematic diagram of the second piezoelectric ceramic;

FIG. 4 is a schematic diagram of working principle of an ultrasonic linear motor;

FIG. 5 is a schematic diagram of quartered model of an ultrasonic linear motor;

FIG. 6 is a schematic diagram of longitudinal vibration mode of quartered model of an ultrasonic linear motor at frequency of 50952 Hz;

FIG. 7 is a schematic diagram of bending vibration mode of quartered model of an ultrasonic linear motor at frequency of 49420 Hz;

FIG. 8 is a partially enlarged schematic diagram of the side of the catheter clamping device;

FIG. 9 is a partially enlarged schematic diagram of cavity and injector.

In these figures, the elements are numbered as follows: 1-liquid inlet, 2-valve core, 3-spring, 4-valve housing, 5-the first infusion hole, 6-the second infusion hole, 7-rubber gasket, 8-retaining ring, 9-the first piezoelectric ceramic, 10-the second piezoelectric ceramic, 11-catheter, 12-end cap, 13-bolt, 14-rubber piston, 15-cavity, 16-injector, 17-injector bracket, 18-floor, 19-shaft sleeve, 10-motor bracket, 21-double end stud, 22-partition, 23-shifting teeth, 24-nut.

DETAILED DESCRIPTION OF THE EMBODIMENTS

Embodiments of the proposed device are described in detail below, and examples of the embodiment are illustrated in the accompanying drawings. From the beginning to the end, the same label denotes the same element or element having the same functions. The embodiments described below in conjunction with the drawings are exemplary to explain the invention and should not be construed as limiting the present invention.

In the description of the present invention, it should be understood that some positional terms such as: lower, upper, sidewall, inner wall, left end, right end, one end, and the other end are used. However, this does not mean that the actual object needs to be strictly followed the requirements of operation. In addition, there are some simple common terms used in the present invention, such as fixed, installed, and connected etc. which should be regarded as terms with generally understood meaning. For example, the word "connection" can be understood as the connection between two parts of a thread or glue. Professional technicians need to understand this issue under specific circumstances.

In the present invention, unless otherwise specified and limited, the terms "installation", "connection", "connection", "fixing", etc. should be understood in a broad sense. For example, connections may be fixed, detachable, or integral. More importantly, it can also be a mechanical connection, an electrical connection, a direct connection, an indirect connection through an intermediate, or an internal connection between two components. A person of ordinary skills in this field can understand the specific meaning of the above terms in the present invention.

Embodiments of the present invention is described below with reference to the accompanying drawings.

As shown in FIG. 1, the ultrasonic stepping motor device for generating ultra-fine single droplet, characterized by comprising valve core 2, spring 3, valve housing 4, rubber gasket 7, catheter 11, rubber piston 14, injector 16, injector bracket 17, floor 18, motor bracket 20, shifting teeth 23 and an ultrasonic linear motor. The valve core 2 and the spring 3 are installed inside the valve housing 4, and the valve core 2 tubs against the liquid inlet 1 of the valve housing 4 under the elastic force of the spring 3. The first infusion hole 5 of the valve housing 4 is connected and communicated with the catheter 11 through the threads. The right end of the catheter 11 is equipped with the rubber piston 14, and the rubber piston 14 is arranged in the cavity 15 of the injector 16 and matched with it.

The injector 16 is supported by the injector bracket 17 installed on the floor 18. The motor bracket 20 is installed on the floor 18 through threaded connection. The ultrasonic linear motor is installed on the motor bracket 20.

The ultrasonic linear motor included the first piezoelectric ceramic 9, the second piezoelectric ceramic 10, a shaft sleeve 19, the double end stud 21, a partition 22 and a nut 24.

The double end stud 21 is fixed on the motor bracket 20. The first piezoelectric ceramic 9 and the second piezoelectric ceramic 10 are symmetrically mounted on the double end stud 21. Further, the second piezoelectric ceramic 10 is located near the center of the double end stud 21, and the first piezoelectric ceramic 9 is placed outside the second piezoelectric ceramic 10. The partition 22 is arranged between the first piezoelectric ceramic 9, the second piezoelectric ceramic 10 and the shaft sleeve 19. The shaft sleeve 19 is arranged at both ends of the double end stud 21 and is compressed by the nut 24.

The shifting teeth 23 are arranged between the shaft sleeve 19 and the nut 24.

The catheter 11 is installed on the upper end of the shifting teeth 23.

It can be seen in FIG. 2, that the first piezoelectric ceramic 9 is a semicircular ring, with a total of eight pieces. As illustrated in FIG. 3, the second piezoelectric ceramic 10 is a circular ring, with four pieces in total. Every two pieces of first piezoelectric ceramics 9 are spliced to form a ring and mounted on the double end stud 21. The polarization directions of the upper and lower the first piezoelectric ceramics 9 on the same plane are opposite. The driving voltage phase difference is 180 degrees. The upper and lower polarization directions of the second piezoelectric ceramics 10 are the same, and the phase difference of the driving voltage is also 180 degrees. The phase difference of the driving voltage between the first piezoelectric ceramic 9 and the second piezoelectric ceramic 10 is 90 degrees.

Figure 4:
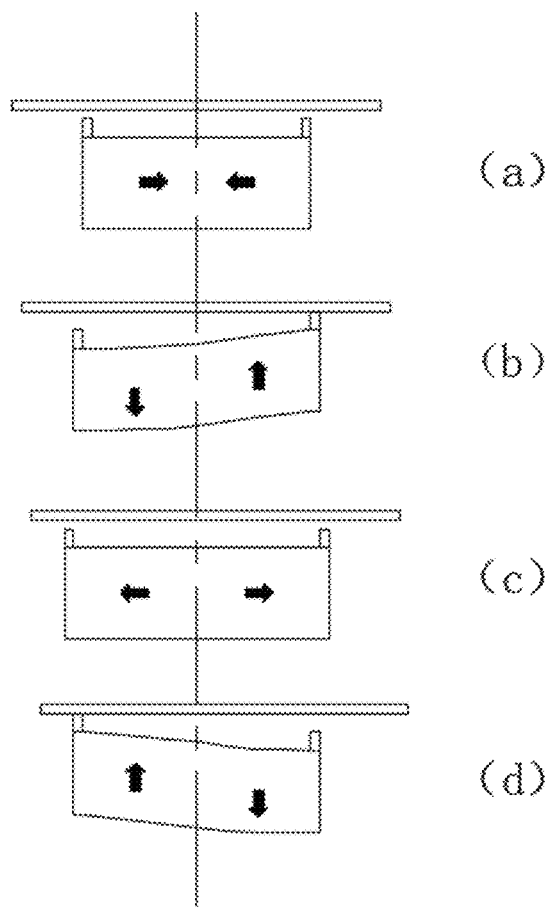

It is presented in FIG. 4, the working principle of ultrasonic linear motor is that the working cycle of the motor is the cycle of a, b, c and d. At first, as shown in FIG. 4a, the longitudinal vibration of the driving vibrator reaches the amplitude position, and the bending vibration is at the equilibrium position. At this time, the surface of the shifting teeth 23 is separated from the catheter 11, the speed of the bending vibration is maximum, and the speed of the longitudinal vibration is zero. After that, as shown in FIG. 4b, the driving vibrator returns to the equilibrium position, and the bending vibration reaches the amplitude position. At this moment, the shifting teeth 23 at the right end contacts the catheter 11, and the longitudinal vibration velocity of its contact surface is the maximum, the direction is the tensile direction, which is to the right, and the bending vibration velocity is zero. After that as shown in FIG. 4c, the longitudinal vibration of the driving vibrator reaches the amplitude position again, and the bending vibration is at the equilibrium position. At this time, the surface of the shifting teeth 23 is separated from the catheter 11, the vibration speed of the bending vibration is the maximum, and the vibration speed of the longitudinal vibration is zero. Finally, as shown in FIG. 4d, the driving vibrator reaches the equilibrium position again, and the bending vibration reaches the amplitude position. At this moment, the shifting teeth 23 at the left end contacts the catheter 11, the longitudinal vibration velocity of its contact surface is the maximum, the direction is the compression direction, which is to the right, and the bending vibration velocity is zero. Under such working cycle, the driving direction of the linear motor is to the right.

Figure 5:
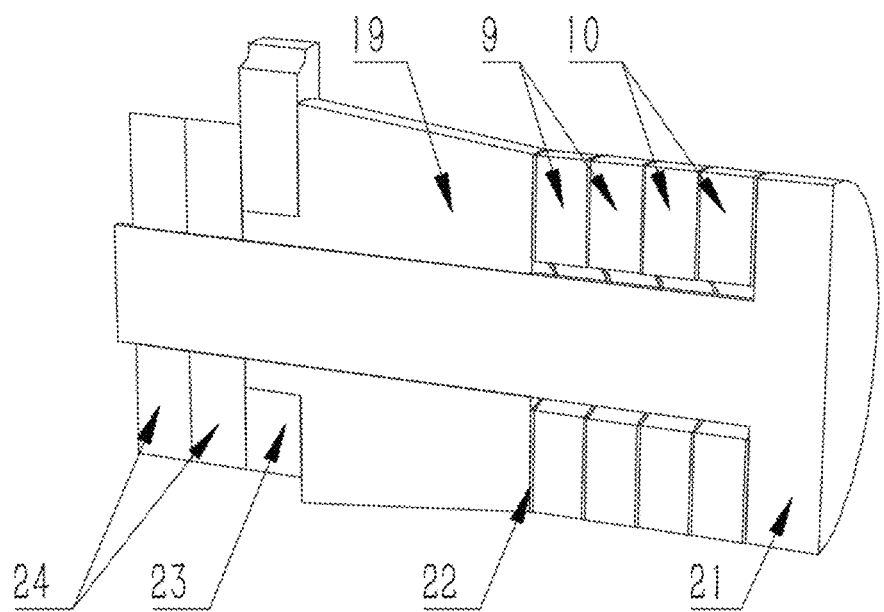

The shape of the shaft sleeve 19 is outward expanding horn shape, as shown in FIG. 5, which can slow down each feed speed of the catheter 11, so that the liquid can overflow slowly and improve the accuracy.

Figure 6:
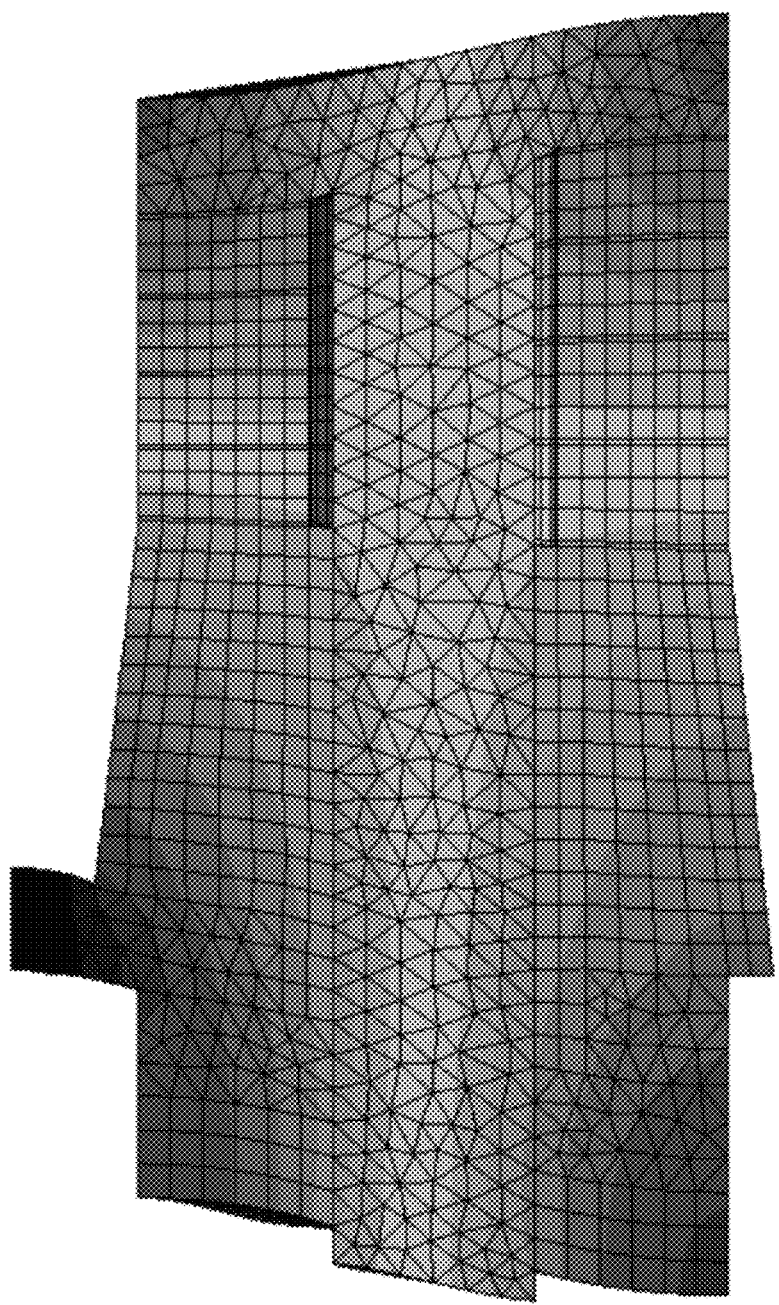
Figure 7:
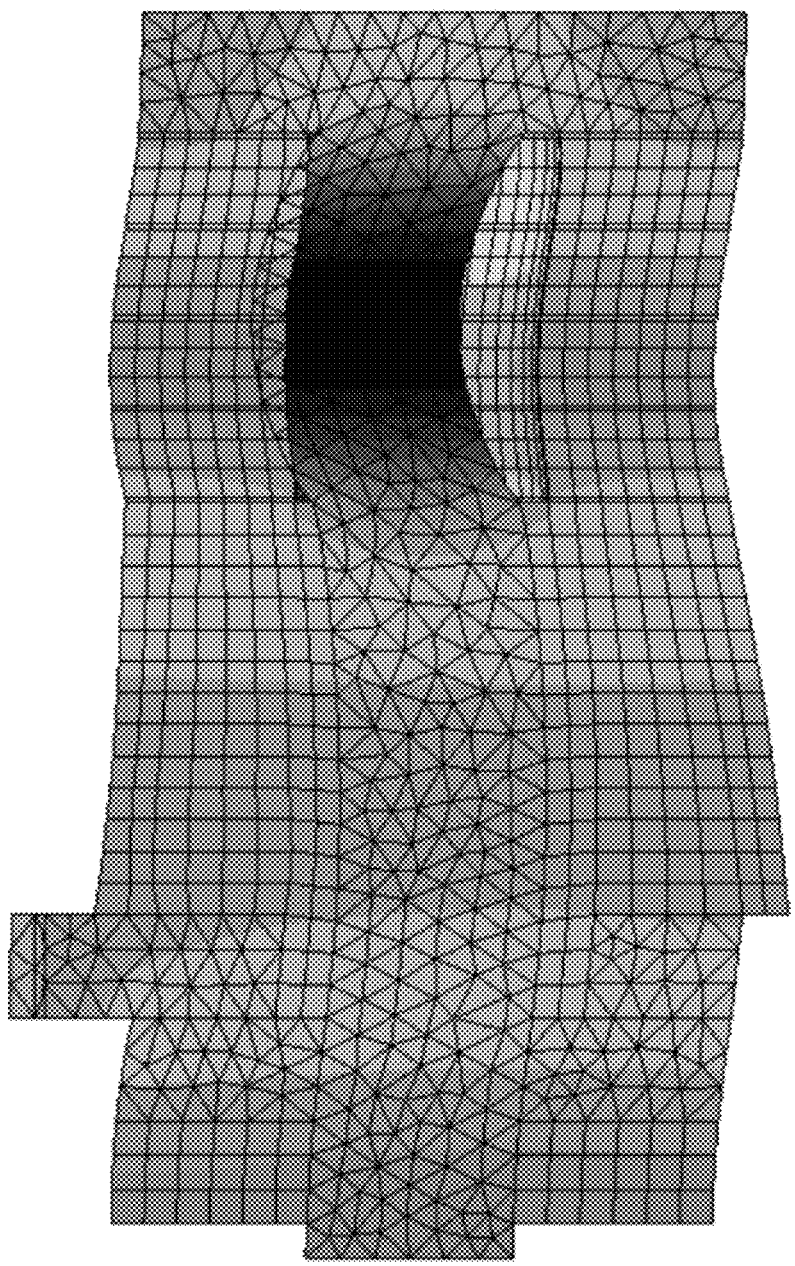

It is illustrated in FIG. 6 and FIG. 7, the ultrasonic linear motor is composed of the first piezoelectric ceramic 9, the second piezoelectric ceramic 10, the shaft sleeve 19, the double end stud 21, the partition 22, the shifting teeth 23 and the nut 24. The modal analysis is carried out to obtain the natural frequencies of the overall longitudinal vibration and bending vibration of an ultrasonic linear motor. Since the motor is symmetrical, in order to simplify the operation, a quadrant model is established in SolidWorks, as shown in FIG. 5. Import the quadrant model into ANSYS Workbench to limit the deformation in the direction of coordinate axis respectively. To calculate the natural frequencies of longitudinal vibration and bending vibration, and obtain the vibration frequencies with the most similar longitudinal vibration frequencies and bending vibration frequencies, are 50952 Hz and 49420 Hz respectively, with a difference of 1.532 kHz, as shown in FIG. 6 and FIG. 7. In order to achieve the resonance between bending vibration and longitudinal vibration of linear motor, the working voltage was set to 50 kHz.

Figure 8:
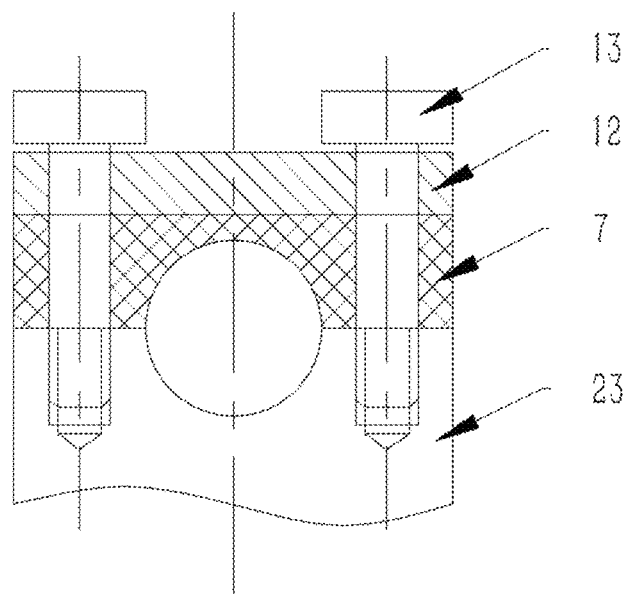
Figure 9:
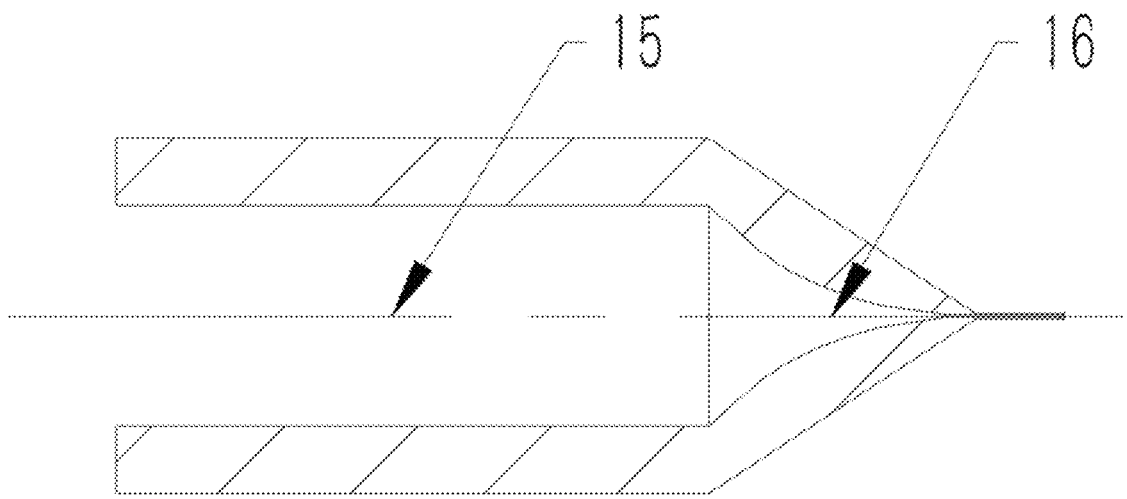

As shown in FIG. 8, the clamping device of the catheter 11 includes the shifting teeth 23, the rubber gasket 7, the end cap 12 and the bolt 13. However, each clamping device is locked with double bolt. The rubber gasket 7 is provided with the end cap 12, and the shifting teeth 23, the rubber gasket 7 and the end cap 12 are connected from bottom to top through the bolt 13. The pre tightening force of the bolt 13 is adjusted to ensure the locking of the catheter 11 during the operation of the linear motor.

The right end of the liquid inlet 1 is equipped with a one-way valve composed of valve housing, 4, valve core 2 and spring 3. When the liquid inlet 1 is filled with liquid, the spring 3 is hydraulically pushed to retract the valve core 2, so that the liquid can enter the first infusion hole 5. When the catheter 11 performs pulse operation, the cavity 15 generates hydraulic pressure. Since the one-way valve composed of valve housing 4, valve core 2 and spring 3 seals the connection between the liquid inlet hole 1 and the first infusion hole 5, and the liquid can overflow from the injector 16 smoothly.

As shown in FIG. 7 if the feed length of catheter 11 is x, the diameter of nozzle inner cavity 15 is $d_1$, and the diameter of injector 16 is $d_2$, the formula can be obtained as:

$$\frac{\pi}{4} d_1^2 x = \frac{\pi}{6} d_2^3$$

The diameter of the cavity 15 is calculated from the diameter of the droplets produced and the size of the single feed catheter 11. The single pulse feed length of the catheter 11 is 6 nm, and the diameter of the injector 16 is 0.05 mm, which produces droplets with a diameter of 0.05 mm.

According to the formula $$\frac{\pi}{4} d_1^2 x = \frac{\pi}{6} d_2^3,$$

the diameter of cavity 15 is about 3.72678 mm.

The liquid inlet 1 has a diameter of 6 mm and a length is 6 mm. The first infusion hole 5 has a diameter of 2 mm and a length of 15 mm. However, the second infusion hole 6 has a diameter of 1 mm and a length of 76 mm. The catheter 11 is provided with a retaining ring 8 on the right side of the shifting teeth 23. The diameter of the retaining ring 8 is drum and the width of 1 mm. The distance from the left wall of retaining ring 8 to the right wall of catheter 11 is 62 mm.

The working process of an ultrasonic stepping motor device for generating ultra-fine single droplet according to the embodiment of the present invention:

Firstly, the entire mechanism is placed vertically to prevent the liquid from flowing directly from the injector 16 in the subsequent liquid injection step. Secondly, drag the catheter 11 to make the right wall of the left shifting teeth 23 contact with the left wall of the retaining ring 8, so that the cavity 15 can empty the maximum space. Then, the liquid is injected from the liquid inlet 1, and the spring 3 is hydraulically pushed to retract the valve core 2, so that the liquid can enter the first infusion hole 5. After that, the liquid enters the cavity 15 through the second infusion hole 6. The injecting of liquids stops liquid when the liquid overflows the injector 16. After completing the above steps, place the entire device horizontally as illustrated in FIG. 1. At this point, the liquid inlet step of the embodiment of the present invention is completed.

Then, the AC excitation voltage signal of the same ultrasonic frequency is applied to the first piezoelectric ceramic 9 and the second piezoelectric ceramic 10. However, the longitudinal and bending vibration modes of the whole motor are stimulated at the same time to move the shifting teeth 23, so that the shifting teeth 23 is excited at the resonance frequency, and the surface nodes of the shifting teeth 23 at both ends in contact with the catheter 11 form an elliptical motion and amplified. When the catheter 11 exerts a certain pre-tightening force to press the shifting teeth 23 at both ends against the moving body. The catheter 11 is driven to make a linear movement through the friction between the shifting teeth 23 and the catheter 11. The linear motion of the catheter 11 can create a feed length to overflow the liquid in the cavity 15. Finally, the ultrasonic frequency excitation voltage signal causes the piezoelectric ceramic sheet to vibrate at an ultrasonic frequency level, and the transmission of vibration causes the overflow liquid to be vibrated, so that the droplets fall off from the injector 16.

The abovementioned embodiment is the preferred embodiment of the proposed device present invention, but the present invention is not limited to the above embodiment. Any obvious improvement, substitution, or modification that a person skilled in the art can make without departing from the gist of the present invention is applicable. It belongs to the embodiment of the present invention